United States Patent
Kintaka et al.

(10) Patent No.: US 6,514,576 B1
(45) Date of Patent: Feb. 4, 2003

(54) METHOD OF MANUFACTURING A DIFFRACTION GRATING

(75) Inventors: Kenji Kintaka, Ikeda (JP); Junji Nishii, Ikeda (JP); Noboru Tohge, Osaka (JP)

(73) Assignee: Agency of Industrial Science and Technology, Tokyo (JP)

( * ) Notice: Subject to any disclaimer, the term of this patent is extended or adjusted under 35 U.S.C. 154(b) by 0 days.

(21) Appl. No.: 09/472,185

(22) Filed: Dec. 27, 1999

(30) Foreign Application Priority Data

Mar. 11, 1999 (JP) .......................... 11-064446

(51) Int. Cl.⁷ ............... B05D 3/06; B05D 5/06; G02B 5/18
(52) U.S. Cl. ............. 427/555; 427/532; 427/554; 427/162; 427/271; 359/569; 359/571
(58) Field of Search ............. 427/532, 533, 427/534, 541, 542, 551, 552, 553, 554, 555, 596, 162, 256, 271, 286, 372.2; 359/566, 569, 571

(56) References Cited

U.S. PATENT DOCUMENTS

| | | | | |
|---|---|---|---|---|
| 5,189,952 A | * | 3/1993 | Ohmura et al. | 101/211 |
| 5,363,220 A | * | 11/1994 | Kuwayama et al. | 359/3 |
| 5,630,872 A | * | 5/1997 | Ogi et al. | 106/287.18 |
| 5,716,762 A | * | 2/1998 | Nishii et al. | 430/321 |

FOREIGN PATENT DOCUMENTS

| JP | 56-43620 A | * | 4/1981 |
|---|---|---|---|
| JP | 04-324401 A | * | 11/1992 |

* cited by examiner

*Primary Examiner*—Michael Barr
*Assistant Examiner*—Wesley D. Markham
(74) *Attorney, Agent, or Firm*—Rader, Fishman & Grauer PLLC

(57) ABSTRACT

This invention provides a method of manufacturing a diffraction grating capable of scribing by an interference light at a lower power density than usual. That is, a coating solution containing a metal alkoxide and a β-diketone is coated on a substrate, the coated film is heat treated to form a gelled film and then an interference light is irradiated to the gelled film, to manufacture a diffraction grating.

15 Claims, 1 Drawing Sheet

METHOD OF MANUFACTURING A DIFFRACTION GRATING

BACKGROUND OF THE INVENTION

The present invention concerns a method of manufacturing a diffraction grating by light irradiation.

A diffraction grating is an optical device in which a plurality of grooves are engraved each at a period of a nm order, which is indispensable as a light source or a receiver for use in optical communication and, further, analyzers. As a base material of the diffraction grating requiring high accuracy, an inorganic material, particularly, glass is usually used. For manufacturing a diffraction grating on a glass substrate, a ruling engine is used and the grating is formed by engraving the grooves one by one. Such a manufacturing method is time consuming and requires a high production cost.

Accordingly, if the grooves of the diffraction grating can be formed by the irradiation of light, it is possible to remarkably shorten the time and reduce the cost. Under the situations as described above, it has been reported recently a method of irradiating an excimer laser beam to a thin $GeO_2$—$SiO_2$ glass film manufactured by sputtering through a phasemask and forming the diffraction grating in accordance with the period of the mask (Japanese Patent No. 2832337). The phase mask is used because the excimer laser beam has no sufficient coherency and no interference fringe can be formed by a usual two beam interference method. Such a method also involves a problem that a pulse light at several tens $mJ/cm^2$ has to be irradiated for several thousands of times for forming.

For overcoming the foregoing problems, it may be considered a method of forming by using an interference light at a lower energy with a large coherent length such as an He—Cd laser or argon ion laser. However, since the thin film formed by the sputtering has low light sensitivity, formation of the diffraction grating is difficult by the interference light at low energy. Accordingly, it has been demanded for the development of a light responsive material of higher sensitivity as a material for the manufacture of a diffraction grating. It has also been demanded for the development of a so-called blazing technique of making the shape of the grating asymmetric in order to improve the diffraction efficiency of the diffraction grating.

SUMMARY OF THE INVENTION

This invention intends to provide a method of manufacturing a diffraction grating capable of forming by an interference light at a lower power density than usual.

The present inventor has found that the foregoing object can be attained by coating a solution containing a metal alkoxide and a β-diketone on a substrate, applying a heat treatment to form a gelled film and irradiating an interference light to the gelled film, and has accomplished this invention.

That is, a method of manufacturing a diffraction grating according to this invention comprises coating a solution containing a metal alkoxide and a β-diketone on a substrate, applying a heat treatment to the coated film to form a gelled film and then irradiating an interference light to the gelled film.

The metal of the metal alkoxide can be, for example, one of zirconium, aluminum or titanium.

The β-diketone can be, for example, any one of benzoyl acetone or acetyl acetone.

The solvent for the coating solution can be a mixed solvent of water and an alcohol.

The alcohol can be at least one alcohol selected from the group consisting of methanol, ethanol and isopropyl alcohol.

The blending ratio for each of the ingredients, by molar ratio, in the coating solution is defined as:

0.5≦metal alkoxide/β-diketone≦3, and 0.01≦(metal alkoxide+β-diketone)/solvent≦2

The coating solution can contain zirconium tetrabutoxide $(Zr(O-nBu)_4)$, benzoyl acetone (BzAcH), ethanol (EtOH) and water ($H_2O$), in which the blending ratio of them, by molar ratio, is defined as:

0.5≦$Zr(O-nBu)_4$/BzAcH≦1.5, 0.1≦$H_2O$/EtOH≦0.2, and 0.01≦$(Zr(O-nBu)_4+BzAcH)/(EtOH+H_2O)$≦0.4.

The coating solution can contain aluminum tri-sec-butoxide $(Al(O-sec-Bu)_3)$, benzoyl acetone (BzAcH), and isopropyl alcohol (i-PrOH), in which the blending ratio of them, by molar ratio, is as defined as:

0.5≦$Al(O-sec-Bu)_3$/BzAcH≦3, and 0.01≦$(Al(O-sec Bu)_3+BzAcH)/(i-PrOH)$≦2.

The coating solution can contain titanium tetrabutoxide $(Ti(O-nBu)_4)$, benzoyl acetone (BzAcH), methanol (MeOH) and water ($H_2O$), in which the blending ratio of them, by molar ratio, is defined as:

0.5≦$Ti(O-nBu)_4$/BzAcH≦2.5, 0.01≦$H_2O$/MeOH≦0.2, and 0.01≦$(Ti(O-nBu)_4+BzAcH)/(MeOH+H_2O)$≦1.

The heat treatment can be applied in atmospheric air at 50 to 150° C. for 1 min to 2 hours.

The light source for the interference light can be an He—Cd laser or an argon ion laser and an average power density for the interference light is preferably from 0.5 to 100 $mW/cm^2$.

After the irradiation of the interference light, the irradiated surface is preferably cleaned with a solvent.

For the solvent, an organic solvent, particularly, an alcohol is used preferably.

After cleaning, a pressurized gas is preferably blown to the light irradiated surface.

It is preferred that the blowing direction of the pressurized gas is in perpendicular to the grooves of the diffraction grating, at an angle of 5 to 80° relative to the substrate and the blowing pressure is from 0.5 to 5 atm.

After the cleaning, a heat treatment is preferably applied at a temperature from 50 to 500° C. for 1 min to 5 hours.

DETAILED DESCRIPTION OF THE PREFERRED EMBODIMENTS

Figure 1:
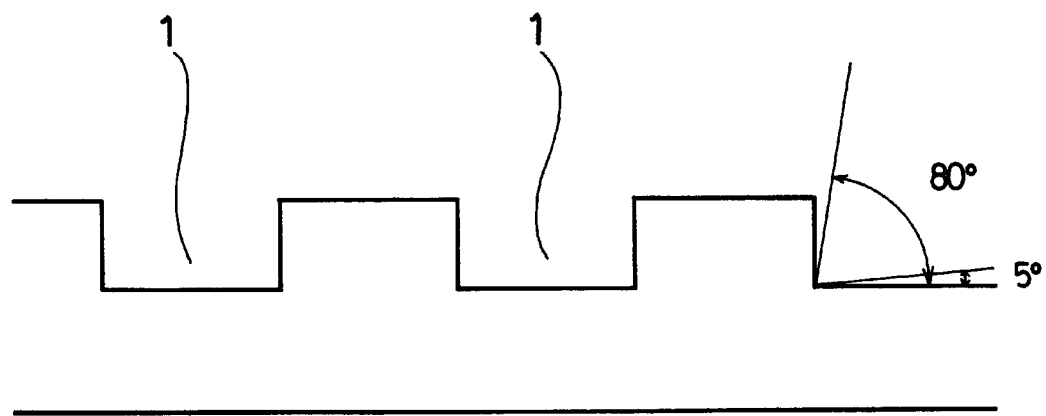
FIG. 1 is a drawing showing a blowing angle of a pressurized gas.

The manufacturing method according to this invention comprises a step of coating a solution containing a metal alkoxide and a β-diketone on a substrate (first step), a step of applying a heat treatment to a coated surface to conduct gelation (second step) and a step of irradiating a light to a obtained gelled film (third step). Each of the steps is to be described more specifically.

First Step

The coating solution used in the first step contains a metal alkoxide and a β-diketone.

There is no particular restriction for the metal of the metal alkoxide so long as the effect aimed in this invention can be attained and the metal can include, for example, zirconium, aluminum, titanium and gallium. Among them, zirconium, aluminum and titanium are preferred.

The alkoxy group in the metal alkoxide can include, for example, linear or branched alkoxy groups of about 1 to 6 carbon atoms such as methoxy, ethoxy, n-propoxy, isopropoxy, n-butoxy, sec-butoxy, tert-butoxy, n-pentyloxy or n-hexyloxy group.

There is no particular restriction for the metal alkoxide used in this invention so long as the effect aimed in this invention can be attained and, it may be properly selected for use from metal alkoxides, for example, comprising optional combinations of the metals and alkoxy groups described above.

Specifically, there can be mentioned zirconium tetrabutoxide, aluminum tri-sec-butoxide, aluminum ethoxide, aluminum-i-propoxide and titanium tetrabutoxide.

The β-diketone can include, for example, those β-diketones of 5 to 13 carbon atoms such as acetyl acetone, benzoyl acetone and dibenzoyl methane. Among them, benzoyl acetone and acetyl acetone are particularly preferred.

There is no particular restriction for the blending ratio (molar ratio) between the metal alkoxide and the β-diketone and this is usually defined preferably as: about $0.5 \leq$ metal alkoxide/β-diketone$\leq 3$ and, particularly, about $1 \leq$ metal alkoxide/β-diketone$\leq 2$ by molar ratio.

There is no particular restriction for the solvent for the coating solution containing the metal alkoxide and the β-diketone and the solvent can be selected properly depending on the kind of the metal alkoxide and the β-diketone.

A preferred solvent can include alcohols of about 1 to 6 carbon atoms (for example, methanol, ethanol, n-propanol, isopropyl alcohol, butanol, pentanol and hexanol). Among them, methanol, ethanol and isopropyl alcohol are preferred.

The solvent may be used alone or two or more of them may be used in combination.

Further, when the alcohol is used, it is preferably combined with water for promoting gelation.

There is no particular restriction on the blending ratio (molar ratio) for the combination of alcohol and water and it can be properly determined depending on the kind and the blending ratio of the metal alkoxide and the β-diketone. It is preferably defined as: about $0 \leq$ water/alcohol$\leq 0.5$ and, particularly, about $0 \leq$ water/alcohol$\leq 0.2$.

The blending ratio (molar ratio) between the metal alkoxide and the β-diketone, and the solvent can be determined property depending on the kind and the combination of them.

It is preferably defined as: about $0.01 \leq$ (metal alkoxide+β-diketone)/solvent$\leq 2$, particularly, about $0.1 \leq$ (metal alkoxide+β-diketone)/solvent$\leq 0.4$.

The coating solution used in this invention can specifically include the followings.

(a) A coating solution containing:
  metal alkoxide: zirconium tetrabutoxide $(Ze(O-nBu)_4)$
  β-diketone: benzoyl acetone (BzAcH) and
  solvent: a mixture of ethanol (EtOH) and water ($H_2O$).

(a') A coating solution in which the blending ratio (molar ratio) for each of the ingredients in the coating solution (a) is:
  $0.5 \leq Zr(O-nBu)_4/BzAcH \leq 1.5$
  $0.1 \leq H_2O/EtOH \leq 0.2$, and
  $0.01 \leq (Zr(O-nBu)_4+BzAcH)/(EtOH+H_2O) \leq 0.4$.

In the coating solution (a') above, the ratio: $H_2O/EtOH$ within the range describe above is preferred since gelation tends to occur properly and there is no possibility of clouding the solution.

The value for $Zr(O-nBu)_4/BzAcH$ and $(Zr(O-nBu)_4+BzAcH)/(EtOH+H_2O)$ within the range described above is preferred since an appropriate gelling rate for the manufacture of a diffraction grating of an optimal shape is obtained in the second step.

(b) A coating solution containing:
  metal alkoxide: Aluminum tri-sec-butoxide $(Al(O-sec-Bu)_3)$
  β-diketone: benzoyl acetone (BzAcH) and
  solvent: isopropyl alcohol (i-PrOH)

(b') A coating solution in which the blending ratio by molar ratio for each of the ingredients in the coating solution (b) is:
  $0.5 \leq Al(O-sec-Bu)_3/BzAcH \leq 3$, and
  $0.01 \leq (Al(O-sec-Bu)_3+BzAcH)/(i-PrOH) \leq 2$ In the coating solution (b'), the value for $Al(O-sec-Bu)_3+BzAcH$ and $(Al(O-sec-Bu)_3+BzAcH)/(i-PrOH)$ preferably within the range described above is preferred since an appropriate gelling rate is obtained for the manufacture of a diffraction grating of an optimal shape.

(c) A coating solution containing:
  metal alkoxide: titanium tetrabutoxide $(Ti(O-nBu)_4)$,
  β-diketone: benzoyl acetone (BzAcH) and
  Solvent: a mixture of methanol (MeOH) and water ($H_2O$)

(c') A coating solution, in which the blending ratio (molar ratio) for each of the ingredients in the coating solution (c):
  $0.5 \leq Ti(O-nBu)_4/BzAcH \leq 2.5$
  $0.01 \leq H_2O/MeOH \leq 0.2$, and
  $0.01 \leq (Ti(O-nBu)_4+BzAcH)/(MeOH+H_2O) \leq 1$ (c") A coating solution, in which the blending ratio for each of the ingredients (molar ratio) in the coating solution (c) is:
  $0.5 \leq Ti(O-nBu)_4/BzAcH \leq 2.5$,
  $0.05 \leq H_2O/MeOH \leq 0.2$, and
  $0.05 \leq (Ti(O-nBu)_4+BzAcH)/(MeOH+H_2O) \leq 0.4$.

In the coating solution (c') above, the $H_2O/MeOH$ ratio within the range described above is preferred since gelation tends to occur properly and there is no possibility of clouding the solution.

In the coating solution (c'), the value of $(Ti(O-nBu)_4/BzAcH)$ and $(Ti(O-nBu)_4+BzAcH)/(MeOH+H_2O)$ within the above mentioned range is preferred since an appropriate gelation rate is obtained for manufacturing a diffraction grating of an optimal shape in the second step.

The value of $H_2O/MeOH$, $(Ti(O-nBu)_4/BzAcH)$ and $(Ti(O-nBu)_4+BzAcH)/(MeOH+H_2O)$ within the range described above is preferred for the coating solution (c"), with the view point described above.

The substrate to which the coating solution is coated, can be used being properly selected from those used usually as the material for the diffraction grating. The material for the diffraction grating can include, for example, silicon substrate, quartz substrate, sapphire glass and slide glass.

Any known coating method can be used as the method of coating the solution and it can be coated by the method, for example, of dip coating or doctor blade.

The coating amount for the coating solution can be determined properly depending on the application use of the diffraction grating, and it is preferably within such an amount as about 5,000 to 30,000 Å as the thickness of the coating film.

Second Step

Since the coating solution is in the form of sol, a heat treatment is applied after the coating for gelling the coating film. There is no particular restriction for the condition of the heat treatment so long as the coating film is gelled. With a view point of the light response or sensitivity of the obtained gelled film, it is preferably conducted in atmospheric air at about 50–150° C. for about 1 min to 2 hours.

Third Step

Then, an interference light is irradiated to the gelled film in which a laser beam source is usually used as a light source for the interference light.

Any laser light source can be used with no particular restriction so long as the coherent length is enough to form an interference fringe and the oscillation wavelength situates in a light response wavelength band of the gelled film.

Such a light source can include, for example, an He—Cd laser (wavelength: 325 nm or 442 nm) or an argon ion laser (wavelength: 244 nm or 400–520 nm). In the method of this invention, the He—Cd laser or argon ion laser is preferably used.

The average power density of the interference light can be properly determined depending on the light response and thickness of the gelled film and it is preferably about from 0.5 to 100 mW/cm$^2$. The range described above is preferred in view of the control for the irradiation time, the shape and the diffraction efficiency of the obtained diffraction grating.

As the interference light, a light obtained by a two beam interference method using a laser light source is used.

The period for the interference light (interference fringe period) can be properly determined depending on the desired period of grooves in the diffraction grating and it is usually about from 0.1 to 10 µm.

The irradiation time of the interference light can be properly determined depending on the composition of the coating solution, the wavelength of the light source, the average power density of the interference light and the desired shape for the diffraction grating and it is usually about from 10 sec to 60 min.

After the irradiation of the interference light, the irradiated surface is usually cleaned with a solvent to remove dark portions of the interference fringe, namely unreacted gels.

As the solvent used for the cleaning, an organic solvent or water can be used, the organic solvent being used preferably.

As the organic solvent, alcohols such as methanol, ethanol and isopropyl alcohol; and ketones such as acetone, ethyl methyl ketone and hexanone are preferred and they can be used each alone or as a combination of them. Use of such solvent is preferred since the unreacted gelled film tends to be dissolved easily.

If the removing rate for the unreacted gelled film is not sufficient in the sole use of the organic solvent, an acid such as nitric acid, hydrochloric acid or sulfuric acid may be added.

There is no particular restriction for an addition amount of the acid and it is preferably 3 vol % or less based on the entire volume of the solvent in view of the diffraction efficiency of the diffraction grating.

The cleaning time can be determined properly depending on the composition of the coating solution and the kind of the cleaning solvent and it is usually about from 0.5 to 60 sec.

In the method of this invention, a pressurized gas can be blown to the light irradiated surface immediately after cleaning with the organic solvent. With such a procedure, the grating can be slanted obliquely by the blowing pressure of the gas to easily conduct so-called blazing.

There is no particular restriction on the kind of the pressurized gas and, for example, helium gas, argon gas, nitrogen gas or gaseous carbon oxide can be used. As the pressurized gas, air or a gas mixture of air and the above-mentioned gas may also be used.

As shown in FIG. 1, blowing of the pressurized gas is conducted on the side of the surface irradiated with the interference light in the direction perpendicular to the grooves 1 of the diffraction grating and the angle is preferably about from 5 to 80° relative to the substrate.

There is no particular restriction on the blowing pressure and it can be determined properly such that a desired blazing can be obtained. Since grating may possibly be destroyed if the blowing pressure is excessively high, it is preferably about from 0.5 to 5 atm.

A diffraction grating that can be put to practical use is obtainable by drying at a room temperature after cleaning with the solvent or after blowing the pressurized gas. The drying time is not particularly limited and usually it is for one hour or more.

The thus obtained diffraction grating is excellent in the physical property such as heat resistance, mechanical strength and chemical endurance and a diffraction grating with further improved physical property can be obtained by applying a further heat treatment.

The heat treatment is preferably conducted in atmospheric air at about 50 to 500° C. for about 1 to 5 hours.

The thus obtained diffraction grating can be used as an optical device for various application uses.

In the gelled film obtained by the heating treatment to a specified coating solution in the method of this invention, a diffraction grating can be optically formed directly by an interference light at a lower power density compared with a thin film formed by a sputtering method, and the diffraction grating can be manufactured more easily by the use of the gelled film. Further, a diffraction grating of excellent physical properties such as heat resistance, chemical endurance and mechanical strength can be obtained easily by the cleaning with the organic solvent and the heat treatment after the irradiation of the interference light.

Explanation is to be made more specifically with reference to examples of this invention.

EXAMPLE 1

Zirconium tetrabutoxide (Zr(O-nBu)$_4$ and benzoyl acetone each in an equimolar amount are mixed in an ethanol/water mixed solution (EtOH:H$_2$O=30:4 molar ratio) so as to provide 34 molar times of dilution, which was dip-coated on a silicon substrate to a coating thickness of 2500 Å. The thus obtained coating film was heat treated in atmospheric air at 80° C. for 20 min.

Then, an interference light obtained by a two beam interference method of an He—Cd laser at a wavelength of 325 nm was irradiated to the thus obtained gelled film (interference fringe period: 0.5 µm) for 15 min. The average power density of the laser on the thin film was 20 mW/cm$^2$.

After the completion of the irradiation, when the light irradiated surface was immediately cleaned with ethanol for 2 sec, a diffraction grating at a 0.5 µm period was formed on the surface.

The first-order diffraction light intensity of the He—Ne laser light of the thus obtained diffraction grating was about 28%. The conditions described above and the results are shown in Table 1.

TABLE 1

| | Example 1 |
|---|---|
| composition of coating solution [molar ratio] | Zr(O-nBu)$_4$ [1] benzoylacetone [1] ethanol [30] + water [4] |
| film thickness (Å) | 2500 |
| irradiation condition | average power density: 20 mW/cm$^2$ time: 15 min period: 0.5 μm |
| cleaning | solution: ethanol time: 2 sec |
| heat treatment | temperature: 450° C. time: 20 min |
| blazing | blowing pressure: — time: — |
| diffraction efficiency | +first-order: 28% −first-order: (+first-order alone could be measured) |

Subsequently, when the diffraction grating was heat treated at 450° C. for 20 min, the shape of the diffraction grating showed scarce change. Further, it was confirmed by X-ray diffractiometry that the diffraction grating after the heat treatment comprises zirconia crystal.

The diffraction grating after the heat treatment was excellent in the heat resistance, chemical endurance and mechanical strength compared with the diffraction grating before the heat treatment.

EXAMPLE 2

Aluminum-sec-butoxide (Al(O-sec-Bu)$_3$) and benzoyl acetone each in an equimolar amount are mixed in an isopropyl alcohol so as to provide 30 molar times of dilution, which was dip-coated on a silicon substrate to a coating thickness of 2000 Å. The thus obtained coating film was heat treated in atmospheric air at 80° C. for 20 min.

Then, an interference light of an He—Cd laser at a wavelength of 325 nm was irradiated to the thus obtained gelled film (interference fringe period: 0.5 μm) for 20 min. The average power density of the laser on the thin film was 20 mW/cm$^2$.

After the completion of the irradiation, when the light irradiated surface was immediately cleaned with an acetone solution containing 1.2 vol % of nitric acid for 10 sec, a diffraction grating at a 0.5 μm period was formed on the surface. The first-order diffraction light intensity of the He—Ne laser light of the thus obtained diffraction grating was about 8%. The conditions described above and the results are shown in Table 2.

TABLE 2

| | Example 2 |
|---|---|
| composition of coating solution [molar ratio] | Al(O-sec-Bu)$_3$ [0.5] benzoylacetone [0.5] isopropyl alcohol [30] |
| film thickness (Å) | 2000 |
| irradiation condition | average power density: 20 mW/cm$^2$ time: 20 min period: 0.5 μm |
| cleaning | solution: acetone + 1.2 vol % HNO$_3$ time: 10 sec |
| heat treatment | temperature: 400° C. time: 20 min |
| blazing | blowing pressure: — time: — |

TABLE 2-continued

| | Example 2 |
|---|---|
| diffraction efficiency | +first-order: 8% −first-order: (+first-order alone could be measured) |

Subsequently, the diffraction grating was heat treated at 400° C. for 20 min. While the shape of the diffraction grating showed scarce reduction in the direction of film thickness, a sufficient diffraction efficiency was obtained. Further, it was confirmed by X-ray diffractiometry that the diffraction grating after the heat treatment comprised alumina crystals.

EXAMPLE 3

After coating a coating solution of the same composition as in Example 1 on a silicon substrate and applying a heat treatment in atmospheric air at 80° C. for 20 min to obtain a gelled film, an interference light at an average power density of 20 mW/cm$^2$ was irradiated to the gelled film (interference fringe period: 0.5 μm) for 15 min. After cleaning the light irradiated surface with ethanol, air at 1 atm was immediately blown in a direction perpendicular to the grooves of the diffraction grating at an angle of 45° relative to the substrate. When a portion of the thus obtained diffraction grating was observed under a scanning electron microscope, each of the gratings was slanted by 45° to form blazing.

When +first-order and −first-order diffraction grating strength of the thus obtained blazed diffraction grating was measured, the ratio between them was 27:9, from which formation of the blazed diffraction grating could be confirmed. The conditions described above and the results are shown in Table 3.

TABLE 3

| | Example 3 |
|---|---|
| composition of coating solution [molar ratio] | Zr(O-nBu)$_4$ [1] benzoylacetone [1] ethanol [30] + water [4] |
| film thickness (Å) | 2500 |
| irradiation condition | average power density: 20 mW/cm$^2$ time: 15 min period: 0.5 μm |
| cleaning | solution: ethanol time: 2 sec |
| heat treatment | temperature: — time: — |
| blazing | blowing pressure: 1 atm air time: 10 sec at 45° |
| diffraction efficiency | +first-order: 27% −first-order: 9% |

EXAMPLES 4–11

Diffraction gratings were manufactured and blazed or heat treated under the conditions shown in Table 4. The manufacturing conditions other than those shown in Table 4 were identical with those in Example 1.

Each of the thus obtained diffraction gratings had excellent diffraction characteristics.

TABLE 4

| Examples | composition of coating solution [molar ratio] | film thickness (Å) | irradiation condition | cleaning | heat treatment | blazing | diffraction efficiency +first-order | diffraction efficiency −first-order |
|---|---|---|---|---|---|---|---|---|
| 4 | Zr(O-nBu)$_4$ [1] benzoylacetone [1] ethanol [30] + water [4] | 2500 | average power density: 40 mW/cm$^2$ time: 20 min. period: 1 μm | solution: ethanol time: 6 seconds | — | — | 15% | 15% |
| 5 | Zr(O-nBu)$_4$ [1] benzoylacetone [1] ethanol [30] + water [4] | 2500 | average power density: 35 mW/cm$^2$ time: 5 min. period: 1 μm | solution: ethanol time: 6 seconds | — | — | 5% | 5% |
| 6 | Ti(O-nBu)$_4$ [1] benzoylacetone [2] methanol [30] + water [4] | 3000 | average power density: 20 mW/cm$^2$ time: 15 min. period: 1 μm | solution: isopropyl alcohol time: 10 seconds | — | — | 10% | 10% |
| 7 | Zr(O-nBu)$_4$ [1] benzoylacetone [1] ethanol [10] | 3500 | average power density: 40 mW/cm$^2$ time: 5 min. period: 1 μm | solution: ethanol time: 6 seconds | — | — | 10% | 10% |
| 8 | Zr(O-nBu)$_4$ [1] benzoylacetone [1] ethanol [50] + water [4] | 1000 | average power density: 40 mW/cm$^2$ time: 40 min. period: 1 μm | solution: ethanol time: 10 seconds | — | — | 10% | 10% |
| 9 | Zr(O-nBu)$_4$ [1] benzoylacetone [1] ethanol [30] + water [4] | 2500 | average power density: 20 mW/cm$^2$ time: 15 min. period: 0.5 μm | solution: ethanol time: 2 seconds | — | blowing pressure: air at 3 atm time: 10 sec. at 70° C. | 25% | 15% |
| 10 | Al(O-sec-Bu)$_3$ [0.5] benzoylacetone [0.5] isopropyl alcohol [10] | 2000 | average power density: 10 mW/cm$^2$ time: 45 min. period: 1 μm | solution: acetone + 1.2 vol & HNO$_3$ time: 10 seconds | temperature: 200° C. time: 60 min. | — | 9% | 9% |
| 11 | Al(O-sec-Bu)$_3$ [0.5] benzoylacetone [0.5] isopropyl alcohol [10] | 2000 | average power density: 30 mW/cm$^2$ time: 5 min. period: 1 μm | solution: acetone + 1.2 vol & HNO$_3$ time: 10 seconds | temperature: 100° C. time: 60 min. | — | 8% | 8% |

COMPARATIVE EXAMPLES 1 AND 2

Diffraction gratings were manufactured in the same manner as in Example 1 except for the conditions shown in Table 5. Then, when the diffraction gratings were heat treated under the conditions shown in Table 5, the diffraction gratings were destroyed in each of the comparative examples, for example, defoliation of the grating from the substrate for deformation for the shape of the gratings.

TABLE 5

| | Comparative Examples 1 | Comparative Examples 2 |
|---|---|---|
| composition of coating solution [molar ratio] | Zr(O-nBu)$_4$ [1] benzoylacetone [1] ethanol [30] | Al(O-sec-Bu)$_3$ [0.5] benzoylacetone [0.5] isopropyl alcohol [30] |
| film thickness | 2500 | 2000 |
| irradiation condition | average power density: 20 mW/cm$^2$ time: 15 min. period: 1 μm | average power density: 20 mW/cm$^2$ time: 15 min. period: 0.5 μm |
| cleaning | solution: ethanol time: 2 sec. | solution: acetone +1.2 vol % HNO$_3$ time: 10 sec. |
| heat treatment | temperature: 950° C. time: 60 min. | temperature: 1000° C. time: 60 min. |
| blazing | blowing pressure: — time: — | blowing pressure: — time: — |
| diffraction efficiency | +first-order: — −first-order: — (measurement impossible) | +first-order: — −first-order: — (measurement impossible) |

What is claimed is:
1. A method of manufacturing a diffraction grating, which comprises:
   coating a coating solution containing a metal alkoxide and a β-diketone on a substrate;
   applying a heat treatment to the coating film to form a gelled film;
   irradiating an interference light to a surface of the gelled film to form a grating;

cleaning the light irradiated gelled film surface with a solvent; and subsequent to the cleaning, blowing a pressurized gas to the light irradiated gelled film surface, the pressure from the pressurized gas causing the grating to be slanted obliquely.

2. A manufacturing method as defined in claim 1, wherein the metal of the metal alkoxide is one of zirconium, aluminum or titanium.

3. A manufacturing method as defined in claim 1, wherein the β-diketone is one of benzoyl acetone or acetyl acetone.

4. A manufacturing method as defined in claim 1, wherein a solvent for the coating solution is a mixed solvent of water and an alcohol.

5. A manufacturing method as defined in claim 4, wherein the alcohol is at least one member selected from the group consisting of methanol, ethanol and isopropyl alcohol.

6. A manufacturing method as defined in claim 1, wherein the blending ratio for a solvent and ingredients, by molar ratio, in the coating solution is defined as: $0.5 \leq$ metal alkoxide/β-diketone$\leq 3$, and $0.01 \leq$ (metal alkoxide+β-diketone)/solvent$\leq 2$.

7. A manufacturing method as defined in claim 1, wherein the coating solution contains zirconium tetrabutoxide ($Zr(O-nBu)_4$), benzoyl acetone (BzAcH), ethanol (EtOH) and water ($H_2O$), in which the blending ratio of them, by molar ratio, is defined as:

$0.5 \leq Zr(O-nBu)_4/BzAcH \leq 1.5$, $0.1 \leq H_2O/EtOH \leq 0.2$, and $0.01 \leq (Zr(O-nBu)_4+BzAcH)/(EtOH+H_2O) \leq 0.4$.

8. A manufacturing method as defined in claim 1, wherein the coating solution contains aluminum tri-sec-butoxide ($Al(O-sec-Bu)_3$), benzoyl acetone (BzAcH), and isopropyl alcohol (i-PrOH), in which the blending ratio of them, by molar ratio, is as defined as:

$0.5 \leq Al(O-sec-Bu)_3/BzAcH \leq 3$, and $0.01 \leq Al(O-sec-Bu)_3+BzAcH)/(i-PrOH) \leq 2$.

9. A manufacturing method as defined in claim 1, wherein the coating solution contains titanium tetrabutoxide ($Ti(O-nBu)_4$), benzoyl acetone (BzAcH), methanol (MeOH) and water ($H_2O$), in which the blending ratio of them, by molar ratio, is defined as:

$0.5 \leq Ti(O-nBu)_4/BzAcH \leq 2.5$, $0.01 \leq H_2O/MeOH \leq 0.2$, and $0.01 \leq (Ti(O-nBu)_4+BzAcH)/(MeOH+H_2O) \leq 1$.

10. A manufacturing method as defined in claim 1, wherein the heat treatment is applied in atmospheric air at 50 to 150° C. for 1 min to 2 hours.

11. A manufacturing method as defined in claim 1, wherein the light source for the interference light is an He—Cd laser or an argon ion laser, and an average power density of the interference light is from 0.5 to 100 mW/cm$^2$.

12. A manufacturing method as defined in claim 1, wherein the solvent is an organic solvent.

13. A manufacturing method as defined in claim 12, wherein the organic solvent is an alcohol.

14. A manufacturing method as defined in claim 1, wherein the pressurized gas is blown in a direction perpendicular to a longitudinal direction of the grooves of the diffraction grating, at an angle of 5 to 80° relative to the substrate, and the blowing pressure is from 0.5 to 5 atm.

15. A manufacturing method as defined in claim 1, wherein a heat treatment is applied at 50 to 500° C. for 1 min to 5 hours after cleaning.

* * * * *